United States Patent [19]

Han

[11] B 3,914,740

[45] Oct. 21, 1975

[54] ERROR DETECTOR FOR PSEUDO-RANDOM SEQUENCE OF DIGITS

[75] Inventor: Swan Bing Han, Hazeldean, Canada

[73] Assignee: Northern Electric Company Limited, Montreal, Canada

[22] Filed: Sept. 4, 1973

[21] Appl. No.: 394,088

[44] Published under the Trial Voluntary Protest Program on January 28, 1975 as document no. B 394,088.

[52] U.S. Cl. ...................... 340/146.1 E; 178/69.5 R

[51] Int. Cl.² ........................................ G08C 25/00

[58] Field of Search ......... 340/146.1 E, 146.1 D, 340/146.1 AL, 178/69.5 R; 179/15 BS

[56] References Cited

UNITED STATES PATENTS

| | | | |
|---|---|---|---|
| 3,315,228 | 4/1967 | Futerfas et al. | 340/146.1 E |
| 3,380,023 | 4/1968 | Magnuski | 340/146.1 E |
| 3,562,710 | 2/1971 | Halleck | 340/146.1 E |
| 3,596,245 | 7/1971 | Finnie et al. | 340/146.1 E |
| 3,689,884 | 9/1972 | Tew, Jr. | 340/146.1 E |
| 3,725,860 | 4/1973 | Kemper et al. | 340/146.1 E |
| 3,755,731 | 7/1973 | Young | 340/146.1 E |
| 3,760,354 | 9/1973 | Ginn | 340/146.1 E |

*Primary Examiner*—Charles E. Atkinson

*Attorney, Agent, or Firm*—John E. Mowle

[57] ABSTRACT

An error detector for a pseudo-random sequence of digits which automatically provides a true error count regardless of the density and pattern of the received errors. The detector first compares the incoming sequence with a replicated sequence to drive indicated error digits. A corrector then compares the sequence arrangement of all indicated error digits to derive a further sequence of only true error digits. Both the detector and corrector will automatically resynchronize if synchronization is lost with only a few false errors being recorded during the interval.

7 Claims, 1 Drawing Figure

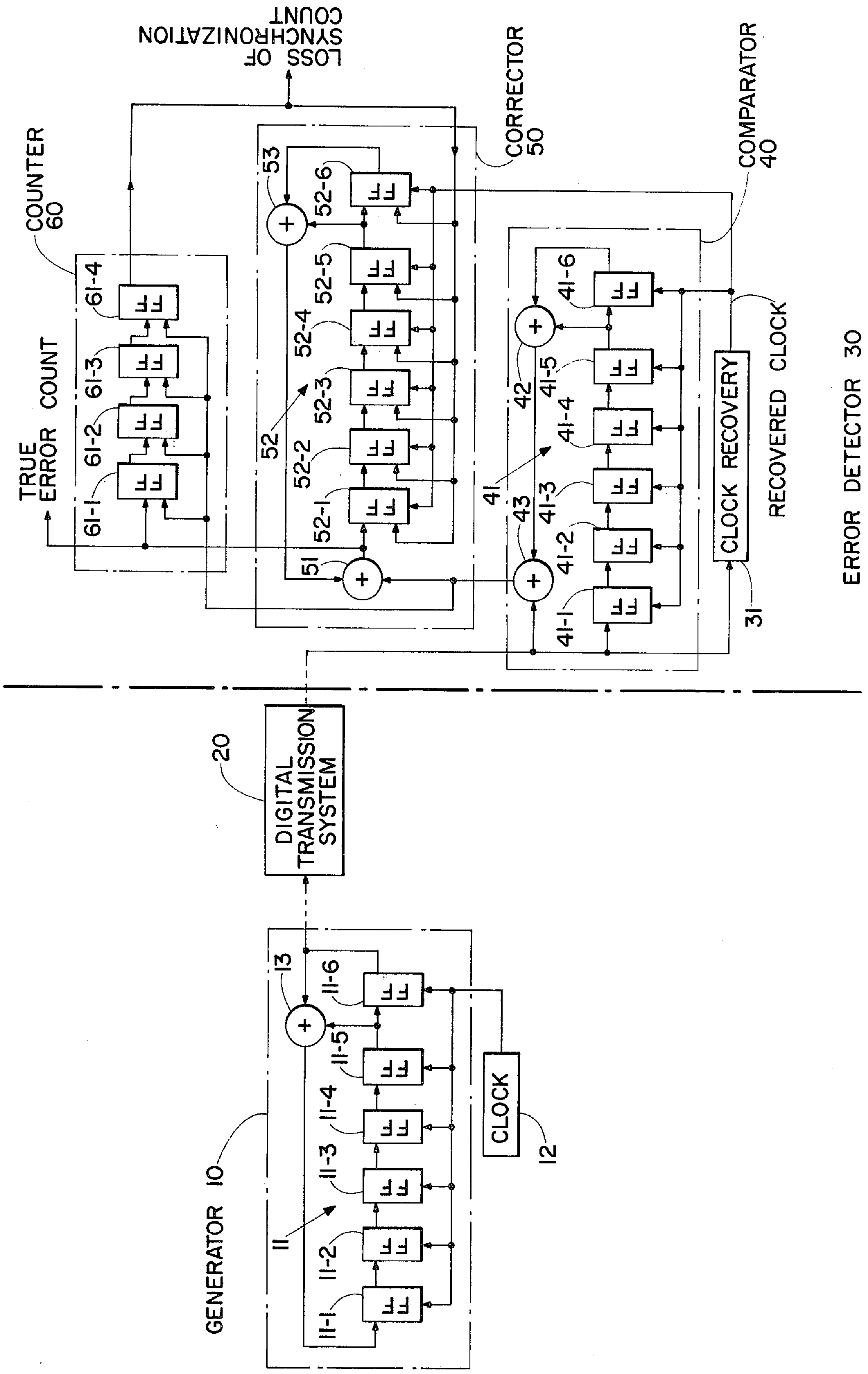
GENERATOR 10
CLOCK
12
11
11-1
11-2
11-3
11-4
11-5
11-6
13
FF
DIGITAL TRANSMISSION SYSTEM
20
ERROR DETECTOR 30
31
CLOCK RECOVERY
RECOVERED CLOCK
COMPARATOR 40
41
41-1
41-2
41-3
41-4
41-5
41-6
42
43
CORRECTOR 50
51
52
52-1
52-2
52-3
52-4
52-5
52-6
53
COUNTER 60
61-1
61-2
61-3
61-4
TRUE ERROR COUNT
LOSS OF SYNCHRONIZATION COUNT

ERROR DETECTOR FOR PSEUDO-RANDOM SEQUENCE OF DIGITS

BACKGROUND OF THE INVENTION

This invention relates to an error detector for a pseudo-random sequence of digits and more particularly to one which automatically provides essentially a true error count regardless of the density and pattern of received errors.

A pseudo-random sequence of digits, usually binary digits, is used to test the performance of a digital transmission system. In a typical test arrangement, the output of a binary sequence generator is connected to the digital transmission system under test. By utilizing a pseudo-random sequence the generator output repeats periodically in a predictable manner and consequently errors introduced in the system by such disturbances as noise, interference, distortion and jitter can be readily detected and counted. A measure of the system performance is the percentage of errors received by the error detector. Typically, a pseudo-random bit sequence is generated at the transmitting end, while at the receiving end an identical pattern is generated for comparison. The comparison bits can be generated either by continuously deriving them from the received digit sequence (automatic mode) or by synchronizing a pattern generator to the received digit sequence (manual mode).

In the automatic mode the indicated error count is not the true error count but is a function of the feedback configuration utilized in the test generator and detector. In a typical arrangement, the indicated error count is three times the actual error count for widely spaced errors. However, where a burst of contiguous errors occurs, the total count will be somewhat less and will be a function of the received errors. A discussion of such an automatic system can be found in "Pseudo-Random-Sequence Binary-Digit Generators and Error Detectors" by D. J. Dieckmann and F. A. Graves, The Post Office Electrical Engineers' Journal, Volume 64, January 1972, pp 245 to 249.

In the manual mode, if the transmitter and receiver remain synchronized, then the indicated error count will be equal to the actual number of errors introduced by the transmission facilities. However, if a "bit slip" occurs in the synchronization between the generator and the error detector, a stream of errors will suddenly be indicated and resynchronization must be manually initiated. Thus, the manual mode delivers a true error count but does not automatically resynchronize if a bit slip should occur. Conversely, the automatic mode provides self-synchronization but does not deliver a true error indication during high-density error intervals.

The disadvantages of both these systems have been partially overcome by monitoring the error rate in a system operating in the manual mode. When this rate exceeds a certain percentage, say 2,000 in 10,000 bits, resynchronization is started automatically. However, this improved system still suffers from the disadvantage that the decision to resynchronize is based upon empirical results of the number of anticipated errors in a normally operating system. Consequently, resynchronization can usually only be started after a large number of errors have been received in order that false resynchronization will not occur.

SUMMARY OF THE INVENTION

The disadvantages of the prior error detectors have been substantially overcome in the present invention by providing a comparator which functions in the automatic mode. However, the output of the comparator is fed to a corrector which by comparing the sequence of indicated errors derives a true error count. If loss of synchronization should occur, the comparator will resynchronize as in the automatic mode.

Loss of synchronization will also disrupt the corrector so that its output will, after a short interval, be greater than that of the comparator. This information can then be utilized to reset the corrector and thereby re-establish a true error count within a very short number of received digits. Consequently, the probability of mistaking a large number of received errors with a loss of synchronization can be made extremely small.

Thus, in accordance with the present invention there is provided an error detector for a pseudo-random sequence of digits which comprises a comparator for comparing the pseudo-random sequence against a replicated sequence to derive indicated error digits during anticoincidence between the two sequences. The detector also includes a corrector for comparing replicated true error digits against the indicated error digits to derive the true error digits during anticoincidence between the replicated and indicated error digits. In a particular embodiment, the detector also includes a counter circuit for resetting the corrector circuit when the true error digits exceed thee indicated error digits by a preselected number.

BRIEF DESCRIPTION OF THE DRAWING

An example embodiment of the invention will now be described with reference to the accompanying drawing which illustrates a pseudo-random sequence error detector in conjunction with a pseudo-random sequence generator.

DESCRIPTION OF THE PREFERRED EMBODIMENT

The following describes a six stage pseudo-random sequence binary generator and detector yielding a maximum length recurrent sequence of $2^6-1=63$ binary digits. It will however be apparent that various feedback configurations can be utilized to yield other recurrent patterns. In both the generator and detector, logic feedback is provided by modulo-2 adders which in binary systems are exclusive-OR gates providing an output of logic 0 whenever the two inputs are coincident, i.e. logic 0-0 of logic 1-1; and an output of logic 1 whenever the two inputs are anticoincident, i.e. logic 0-1 or logic 1-0. It will also be apparent that the principles of the invention can be applied to generate any pseudorandom sequence of length $p^n-1$, where $p$ is a prime number and $n$ is a natural number.

Referring to the single figure, there is illustrated the pseudo-random sequence generator 10 the output of which is fed through a digital transmission system 20 which is under test. The output of the system 20 is fed to the pseudo-random sequence error detector, generally 30 which basically comprises a comparator 40, a corrector 50 and a counter 60. The detailed structure of the invention will be readily apparent from the following description of its function and operation.

The pseudo-random sequence generator 10 comprises a six-stage shift register 11 comprising cascaded flip-flops (FF) 11-1 to 11-6 which are driven from a clock 12. The outputs of the fifth and sixth flip-flips 11-5 and 11-6 are fed to the two inputs of an exclusive-OR gate 13. The output of the OR gate is in turn connected to the input of the flip-flop 11-1 to provide the necessary feedback to generate a maximum length recurrent sequence pattern of 63 digits. While the output from the generator 10 is taken from the flip-flop 11-6, it can be derived from any stage as the output sequences are identical but displaced in time with respect to each other.

The output from the pseudo-random sequence generator 10 is fed through the digital transmission system 20 under test to the input of the error detector 30. One input to the error detector 30 is fed to a clock recovery circuit 31 which regenerates clock synchronization pulses used to drive the comparator 40 and the corrector 50. A second input to the error detector 30 is connected to a six-stage shift register 41 in the comparator 40 which comprises six serially connected flip-flops 41-1 to 41-6. As in the generator 10, the outputs, of the fifth and sixth flip-flops 41-5 and 41-6 are fed to an exclusive-OR gate 42. The output of the exclusive-OR gate 42 is compared on a bit-by-bit basis against the incoming pulse stream from the digital transmission system 20 in a modulo-2 adder or exclusive-OR gate 43. It will be observed that except during the interval when errors are being received, the output of the exclusive-OR gate 42 is a replicated sequence of the input to the comparator 40 from the digital transmission system 20. Consequently, the receipt of a single error digit from the system 20 (either a logic 1 or 0) will cause anticoincidence at the output of the OR gate 43 when the error appears at the input to the flip-flop 41-1 and again when it appears at the output of the flip-flops 41-5 and 41-6. As a result, a total of three indicated error digits (logic 1's) will appear at the output of the exclusive-OR gate 43 for every widely spaced error digit entering the comparator 40 from the digital transmission system 20. However, when a second error digit enters the comparator 40 before a first error digit has been cleared through the shift register 41, cancellation may take place thereby negating the anticoincidence between the two binary digits being compared in the exclusive-OR gate 43. As a result, the total number of true errors introduced in the digital transmission system 20 will be greater than one-third the number indicated at the output of the exclusive-OR gate 43.

A true error count is however obtained from the corrector 50 providing the comparator 40 remains in synchronization with the generator 10. The output of the exclusive-OR gate 43 is fed to one input of an exclusive-OR gate 51. The output of the exclusive-OR gate 51 is in turn fed to a six-stage shift register 52 comprising serially connected flip-flops 52-1 to 52-6. Feedback from the shift register 52 is obtained from an exclusive-OR gate 53 whose inputs are also derived from the outputs of the fifth and sixth flip-flops 52-5 and 52-6. The output of the exclusive-OR gate 53 is in turn fed to the other input of the exclusive-OR gate 51. Both shift registers 41 and 52 are driven from the output of the clock recovery circuit 31.

When an error-free signal is being received from the digital transmission system 20, a continuous stream of logic 0's is obtained at the output of the exclusive-OR gate 43. During this interval, logic 0's are being continuously circulated around the corrector 50. The coincidence of logic 0's at the outputs from the exclusive-OR gates 43 and 53 results in a zero error count, i.e. logic 0's at the output of the exclusive-OR gate 51. The initial receipt of a single error digit from the digital transmission system 20 results in anticoincidence at the inputs to the exclusive-OR gate 43. Hence, a logic 1 appears at the output of the gate 43 and hence at the output of the gate 51. However, because the delay through the shift registers 41 and 52 is identical, additional logic 1's resulting from the receipt of the initial error digit emerge coincidently at the output of the gates 43 and 53 and are thereby cancelled in the exclusive-OR gate 51 so as to yield a true error count of logic 1's at its output. As a result, a true error count is recorded as long as the comparator 40 remains in synchronization with the generator 10.

If a "bit slip" should occur and synchronization is lost, initially a number of errors will be recorded at the output of the comparator 40 until resynchronization between it and the generator 10 is automatically re-established. However, these pulses will be of such a sequence that once synchronization is re-established in the comparator 40, the corrector 50 will continue to circulate a pseudo-random sequence of logic 1's and 0's rather than all logic 0's, even though logic 0's are being received from the exclusive-OR gate 43 indicating an error-free signal. As a result, a false error count is recorded at the output of the exclusive-OR gate 51. Due to the circulating pseudo-random sequence of binary digits in the corrector 50, the output of logic 1's from the exclusive-OR gate 51 will now be greater than that from the output of the exclusive-OR gate 43 thus indicating synchronization has been lost. This information is utilized to reset the corrector 50 by coupling the output of the exclusive-OR gate 51 to the input of the counter 60 and utilizing the output of the exclusive-OR gate 43 to reset it. The four stage counter 60 comprising flip-flops 61-1 to 61-4 provides a reset signal at its output which is used to reset the shift register 52. When the system is synchronized, the number of indicated error digits at the output of the exclusive-OR gate 43 is up to three times the number of true error digits at the output of the exclusive-OR gate 51. Consequently, the counter 60 is continually being reset by the output of the exclusive-OR gate 43 so that no output is obtained therefrom. However, after loss of synchronization, the false error output of the exclusive-OR gate 51 will cause the four-stage counter 60 to count up until a reset signal is derived at its output which in turn is utilized to reset the corrector 50 so that it again circulates logic 0's during error free intervals. Thereafter, the output of the exclusive-OR gate 51 is again the true error count.

The reset interval of the corrector 50 is a function of the counter 60. If the interval is too short, false resetting of the corrector 50 can result. On the other hand, a longer reaction time results in a greater number of false errors being recorded from the output of the exclusive-OR gate 51 before resetting of the shift register 52 takes place. Utilizing a count in the order of twice the number of stages in the shift register 52 (i.e. $2\times6=12$ in the example embodiment) provides substantial immunity to false resetting of the corrector 50. In the present embodiment, the counter 60 comprises four cascaded flip-flops 61-1 to 61-4 yielding a reset pulse after a count of 16 bits from the gate 51 without an error pulse being received from the gate 43. It will be apparent that with this arrangement the reaction interval required to accurately reset the corrector 50 after loss of synchronization is relatively small. The output of the counter 60 yields the number of times synchronization is lost.

In an alternate embodiment where a relatively long shift register is being used in the corrector 50, it may be advantageous to use an up-down counter with no negative count (i.e. on a down count, it stops at zero) in place of the counter 60. With this arrangement, the occasional reset pulse from the gate 43 will simply decrease the total count in the counter 60 by one rather than reset it. During synchronized operation, the larger output from the gate 43 would maintain the total count in the counter 60 at or near zero.

In summary, the error detector 30 provides a true error count regardless of the density and pattern of the received errors as long as synchronization is maintained. Resynchronization can be established with a high degree of certainty after relatively few false error digits have been recorded.

What is claimed is:

1. In an error detector for a pseudo-random sequence of digits comprising:

means responsive to said sequence of digits for generating a replicated sequence of digits; and means for comparing corresponding digits of the replicated sequence with those of said pseudo-random sequence to derive indicated error digits when anticoincidence is detected between said sequences;

the improvement comprising:

means responsive to true error digits for generating replicated error digits; and means for comparing said indicated error digits with said replicated error digits to derive said true error digits when anticoincidence is detected between said indicated and replicated error digits.

2. An error detector as defined in claim 1 in which the improvement additionally comprises:

means for counting said true error digits to derive a signal for resetting the means for generating replicated error digits, said counting means being reset by said indicated error digits so as to re-establish a true error count after loss of synchronization.

3. An error detector, for detecting errors in a digital transmission system including a pseudo-random sequence generator for transmitting $2^n-1$ sequence of pseudo-random binary digits where $n$ is a natural number, the error detector comprising:

first and second $n$-stage shift registers, first and second modulo-2 adders connected in like combination to selected stages of the first and second $n$-stage shift registers respectively to replicate at the outputs of said adders the binary inputs to said shift registers;

a third modulo-2 adder having one input connected to the output of the first modulo-2 adder;

means for connecting said sequence of binary digits, from said pseudo-random sequence generator transmitted via said digital transmission system, to the input of the first $n$-stage shift register and to the other input of the third modulo-2 adder to derive at the latter's output indicated error digits at effectively triple the true error rate;

a fourth modulo-2 adder having one input connected to the output of the third modulo-2 adder, the other input connected to the output of the second modulo-2 adder, and its output connected to the input of the second $n$-stage shift register to derive from its said output true error digits.

4. An error detector as defined in claim 3 which additionally comprises a counter of about $2^n$ digits having its input connected to the output of the fourth modulo-2 adder, the counter including a reset means connected to the output of the third modulo-2 adder; and the second $n$-stage shift register including a reset means connected to the output of the counter so as to re-establish a true error count after loss of synchronization with the sequence of pseudo-random binary digits.

5. A corrector, for an error detector including a comparator for comparing a pseudo-random sequence of digits against a replicated sequence of digits to derive indicated error digits during anticoincidence between the sequences;

the corrector comprising:

means responsive to true error digits for generating replicated error digits; and means for comparing said indicated error digits with said replicated error digits to derive said true error digits when anticoincidence is detected between said indicated and replicated error digits.

6. An arrangement as defined in claim 5 additionally comprising:

a counter for resetting the corrector when the true error digits exceed the indicated error digits by a preselected number.

7. An error detector for a pseudo-random sequence of binary digits comprising:

a comparator including a first $n$-stage shift register, a first modulo-2 adder connected to selected stages of said first $n$-stage shift register to replicate at the output of said first modulo-2 adder the binary input to said first $n$-stage shift register, a second modulo-2 adder having one input connected to the output of the first modulo-2 adder; and means for connecting the pseudo-random sequence of binary digits to said first $n$-stage shift register and to the other input of the second modulo-2 adder to derive at the latter's output indicated error digits at effectively triple the true error rate;

a corrector including a second $n$-stage shift register, a third modulo-2 adder connected to selected stages of said second $n$-stage shift register to replicate at the output of said third modulo-2 adder the binary input to said second $n$-stage shift register;

a fourth modulo-2 adder having one input connected to the output of the second modulo-2 adder and the other input connected to the output of the third modulo-2 adder to derive at its output true error digits, the fourth modulo-2 adder being connected to the input of the second $n$-stage shift register.

* * * * *